US012100255B1

(12) United States Patent
Markbreiter

(10) Patent No.: US 12,100,255 B1
(45) Date of Patent: Sep. 24, 2024

(54) PULSE ENABLED SECURE DOOR ACCESS SYSTEM AND METHOD OF USE

(71) Applicant: Ross Markbreiter, Orange, CA (US)

(72) Inventor: Ross Markbreiter, Orange, CA (US)

( * ) Notice: Subject to any disclaimer, the term of this patent is extended or adjusted under 35 U.S.C. 154(b) by 0 days.

(21) Appl. No.: 17/704,763

(22) Filed: Mar. 25, 2022

Related U.S. Application Data

(63) Continuation-in-part of application No. 17/591,638, filed on Feb. 3, 2022, now abandoned.

(51) Int. Cl.
*G07C 9/37* (2020.01)
*G07C 9/00* (2020.01)

(52) U.S. Cl.
CPC ........... *G07C 9/37* (2020.01); *G07C 9/00563* (2013.01)

(58) Field of Classification Search
CPC ... A61B 5/0002; A61B 5/0022; A61B 5/1101; G06F 21/32; G06Q 30/0288; G06Q 50/22; G07C 9/00563; G07C 9/37; G16H 40/63; G16H 40/67; G16H 50/20
See application file for complete search history.

(56) References Cited

U.S. PATENT DOCUMENTS

| | | | | | |
|---|---|---|---|---|---|
| 9,589,439 | B2 * | 3/2017 | Golden | G08B 15/00 |
| 11,170,894 | B1 * | 11/2021 | Kocher | A61B 5/1176 |
| 2013/0173287 | A1 * | 7/2013 | Cashman | H04N 7/141 705/2 |
| 2018/0158551 | A1 * | 6/2018 | Bradley | H04L 63/0861 |
| 2020/0372743 | A1 * | 11/2020 | Miller | G07C 9/257 |
| 2021/0010315 | A1 * | 1/2021 | Honjo | G07C 9/37 |
| 2021/0065489 | A1 * | 3/2021 | Hass | G07C 9/22 |
| 2021/0295005 | A1 * | 9/2021 | Khuri-Yakub | A61B 5/1172 |
| 2021/0342020 | A1 * | 11/2021 | Jorasch | G06F 21/32 |
| 2022/0068070 | A1 * | 3/2022 | Ouellette | G07C 9/30 |

* cited by examiner

*Primary Examiner* — Stephen R Burgdorf

(57) ABSTRACT

A pulse secure doorbell system uses temperature and biometric readings from a person to determine their identity and their health status in order to allow entry through a door. A person presses their finger against a scanner that takes their print and their pulse. A camera measures the face. A thermometer measures their temperature. These metrics combine to provide a complete profile of the person prior to entry.

2 Claims, 4 Drawing Sheets

PULSE ENABLED SECURE DOOR ACCESS SYSTEM AND METHOD OF USE

BACKGROUND

1. Field of the Invention

The present invention relates generally to security systems and methods, and more specifically, to a pulse secure doorbell system that screens people that seek entrance through a doorway to ensure their identity and health status. The pulse, temperature, and other aspects of the health of the applicant are checked unobtrusively through a camera or touch surface.

2. Description of Related Art

Security systems are well known in the art and are effective means to ensure the safety of people and property against malicious threats or innocuous occurrences. Common security systems access control to secure spaces that are created through the use of door locks to biometric identification. An example of a common entry security system is a doorbell. A person will activate the bell which emits a sound within a secure space such as a home or office so that a person who is authorized to grant entry to the space approaches the door to verify the person for entry. If access is granted the person is allowed to enter, if they are not granted access, the door is closed and could be locked to ensure that the space remains secure after the rejection.

One of the problems associated with common security systems is their limited use. For example, when a person's identity is verified through visual inspection by another person, they do not have the capability to determine the health status of the applicant and might allow an unhealthy person into the secure space and expose of people there to the illness carried by the person who entered Additionally, the person who verifies the identity of the person who requested access must expose themselves to any illness that the person carries.

Accordingly, although great strides have been made in the area of security systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
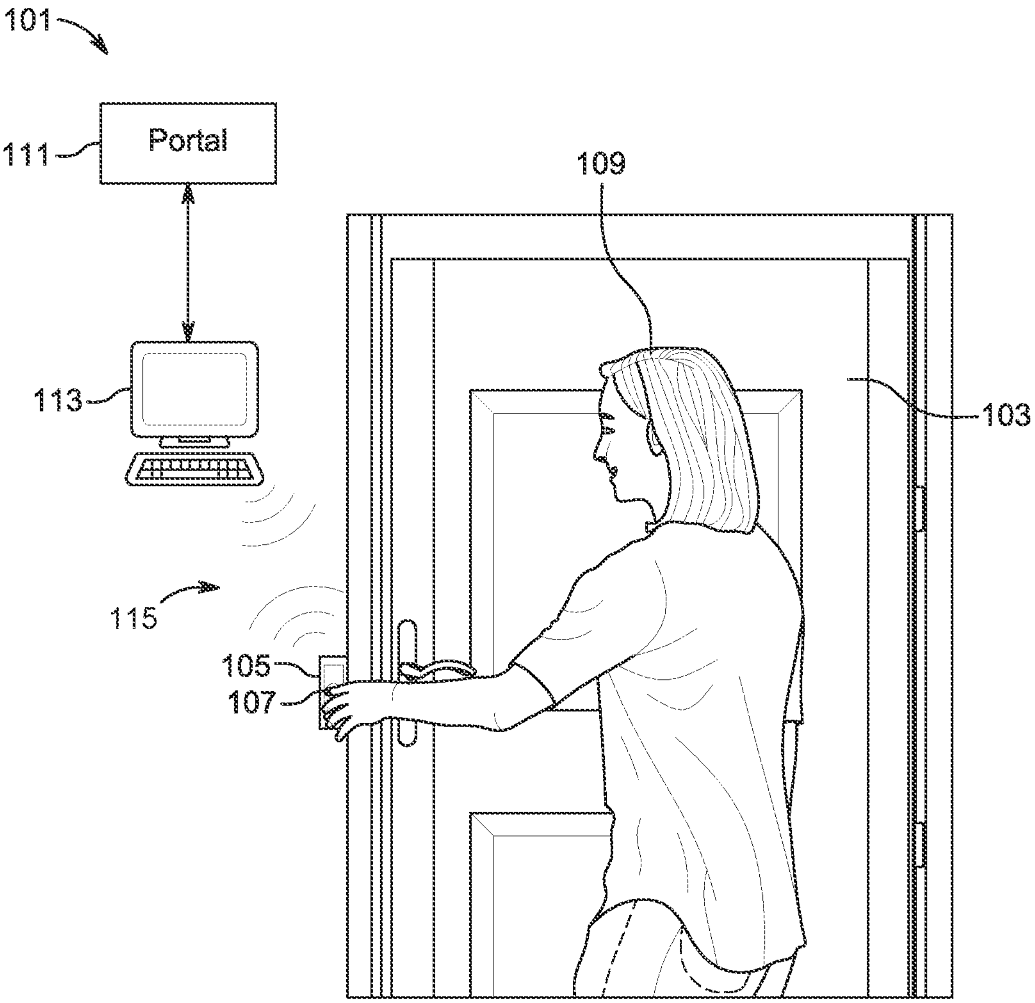
FIG. 1 is a front view of a pulse secure doorbell system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional security systems. Specifically, the present invention enables the verification of the identity and health status of a person who seeks entry to a secure area. Additionally, the invention of the disclosure enables the verification of a person and protects the individual who performs the verification from contamination if a disease is present. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a front view of a pulse secure doorbell system in accordance with a preferred embodiment of the present application. It will be appreciated that system 101 overcomes one or more of the above-listed problems commonly associated with conventional security systems.

In the contemplated embodiment, system 101 includes an interface 105 that is activated by the finger 107 of a user 109, where the interface is configured to control passage through a door 103. The interface 105 is in electronic communication with a portal 111 via a computing device 113 such as through a network 115.

Figure 2:
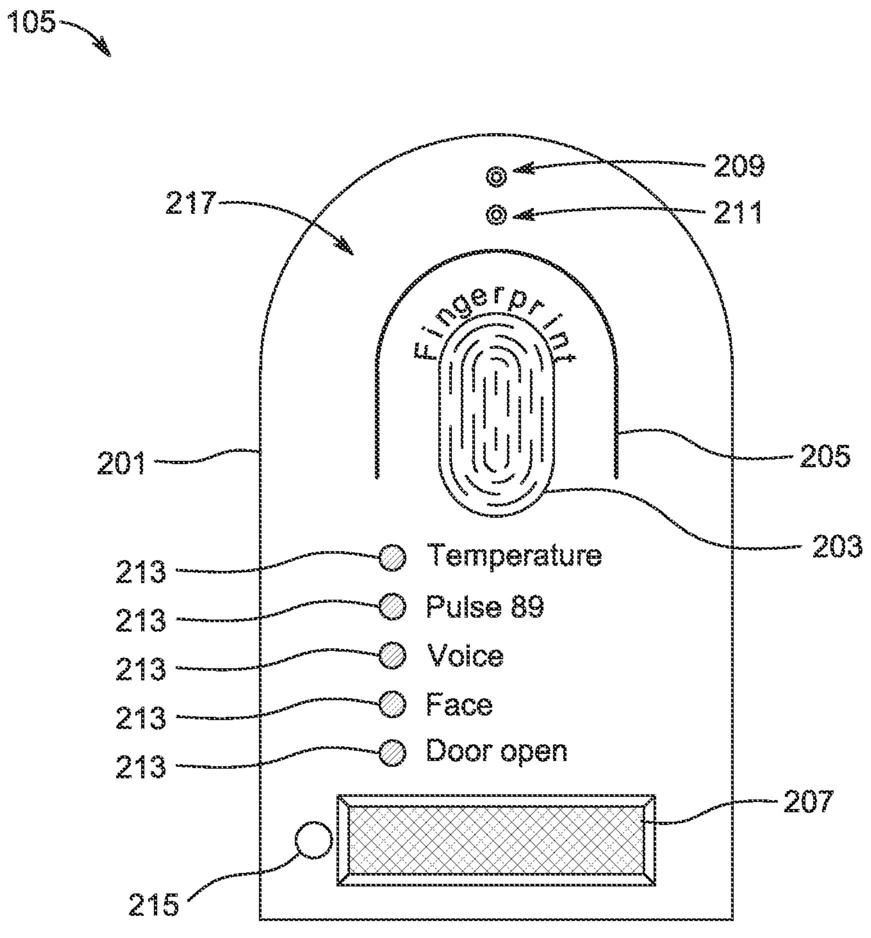
FIG. 2 is a front view of the interface of FIG. 1.

Referring to FIG. 2 interface 105 is further depicted and includes a body 201 that has a scanner 203 configured to read the print of finger 107. Scanner 203 is protected by a shield 205 that is attached to the front surface 217 of body 201. A speaker 207 is also attached to body 201 and works in conjunction with a microphone. Body 201 also has a camera 209 and thermometer 211 attached to front surface 217. Indicators 213 are also attached to front surface 217. An emergency device 215 is also attached to body 201 and is configured to contact emergency services such as '911' when activated.

It is contemplated that any measurement device or combination of measurement devices could be included in interface 105 to determine the identity or health of user 109. In the preferred embodiment the fingerprint, pulse, face, temperature, and voice are used to verify the identity of and health of user 109.

Figure 3:
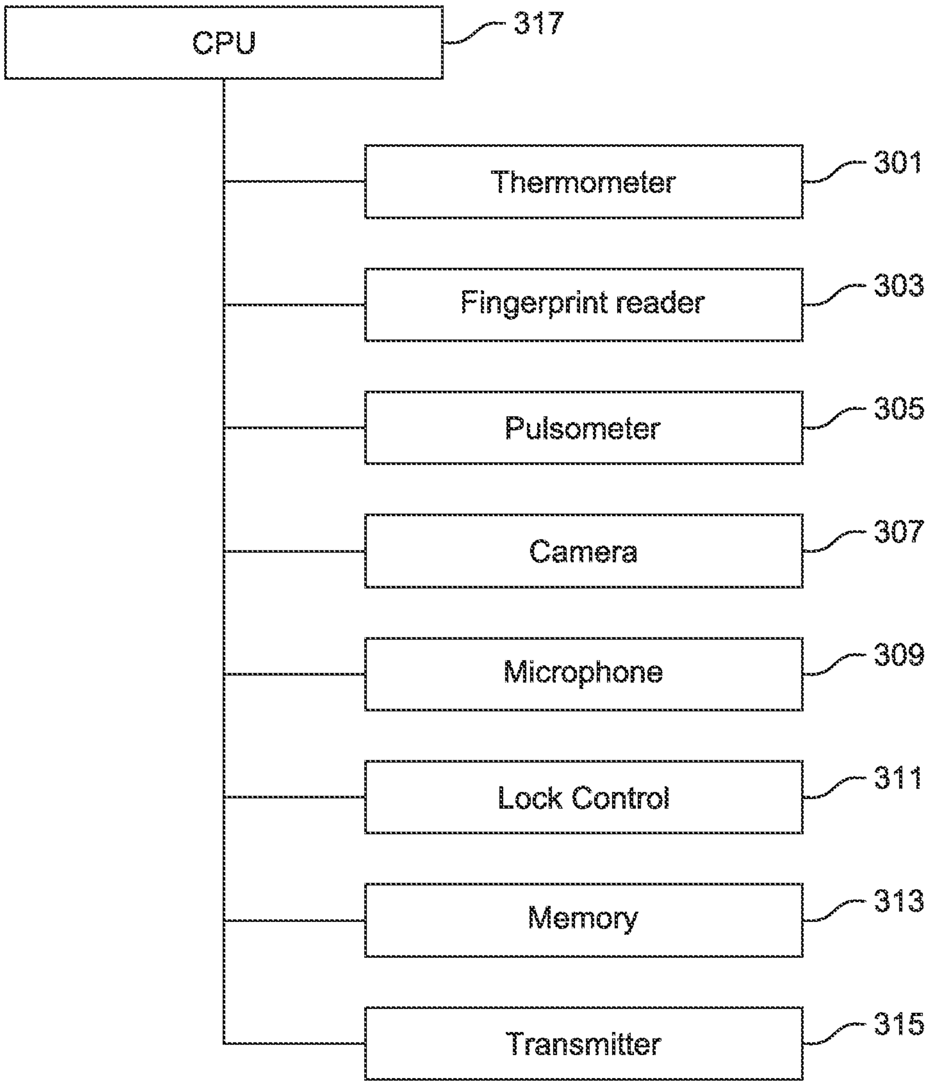
FIG. 3 is a simplified schematic of the interface of FIG. 2.

Interface 105 is contemplated to include components that enable the function thereof. An example of these components is depicted in FIG. 3. A thermometer 301, fingerprint reader 303, pulsometer 305, camera 307, microphone 309, lock control 311, and transmitter 315 communicate with and are operated by a CPU 317 that also uses memory 313 to store computer commands and the like.

In use, interface 105 is placed near door 103 and controls the locking mechanism thereof. User 109 approaches interface 105 and places their finger 107 on scanner 203 that reads the print and transmits it to portal 111 where computing device 113 analyzes the data from scanner 203, camera 209, and thermometer 211 to determine the identity of user 109 and their health. When interface 105 obtains or validates data an indicator 113 therefore is activated. For example, when the temperature of user 109 is taken and found to be normal an LED turns green. If communication is needed speaker 207 and a microphone are used to talk with user 109. In this way portal 111 provides feedback on the identity of user 109 and their health and determines if they are approved for entry through door 103. It is contemplated that when a user has been validated that all of the LEDs could be green in color.

It should be appreciated that one of the unique features believed characteristic of the present application is that portal 111 and interface 105 enable the authorization and verification of user 109 and their health status without exposure of a person to user 109.

Figure 4:
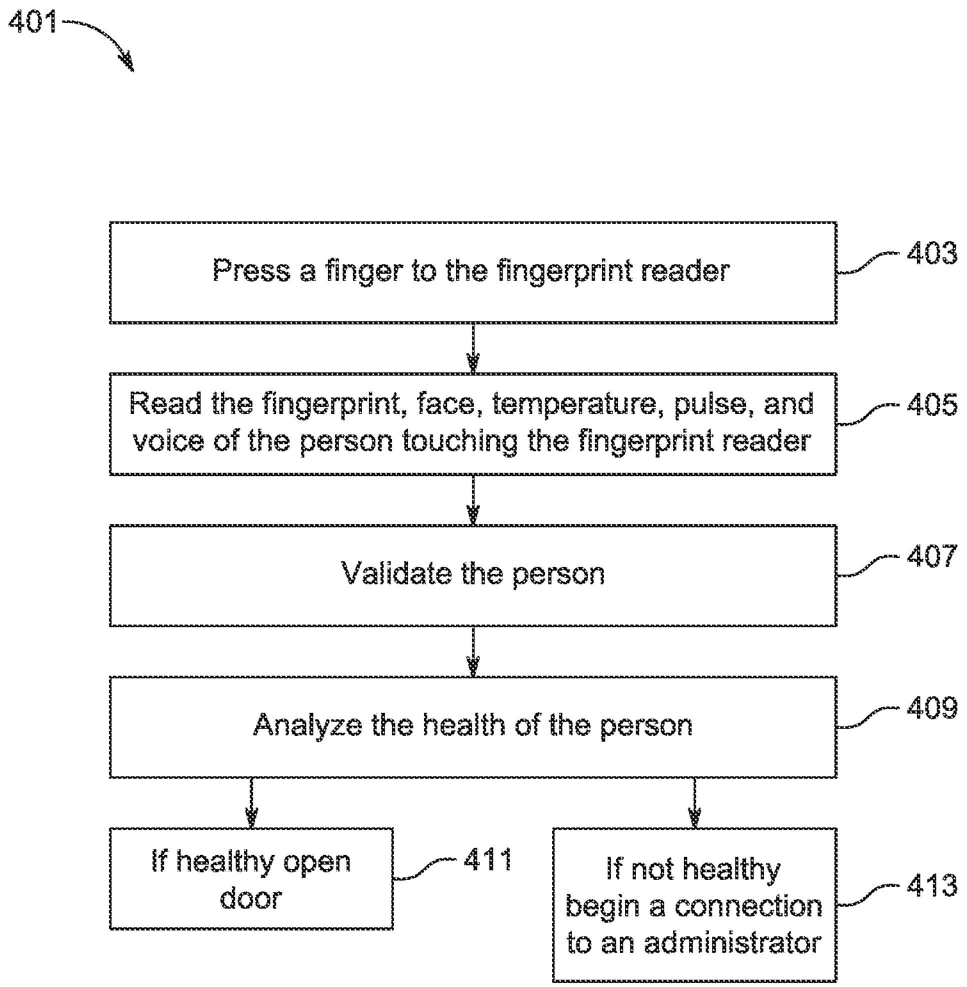
FIG. 4 is a flowchart of a method of verifying the identity and health of a person.

Referring now to FIG. 4 a method of verifying the identity and health of a person is depicted. Method 401 includes pressing a finger to a fingerprint reader 403, reading the fingerprint, face, temperature, pulse, and voice of the person touching the fingerprint reader 405, validating the person 407, analyzing the health of the person 409, and if healthy opening a door 411, and if not healthy beginning a connection to an administrator 413.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A system comprising:

an interface that includes:

a body having a front surface;

a scanner attached to the front surface of the body, the scanner configured to measure a pulse of a user and to read a fingerprint of the user via pressing a finger of the user against the scanner;

a thermometer that determines a temperature of the user;

a first indicator on the front surface configured to illuminate as the temperature of the user is determined;

a second indicator on the front surface configured to illuminate as the pulse and the fingerprint of the user is determined;

a third indicator on the front surface that is configured to illuminate as a voice of the user is recognized;

a fourth indicator on the front surface that is configured to illuminate as the face of the user is recognized;

a fifth indicator on the front surface that is configured to illuminate to indicate door open status;

a camera secured to the front surface and configured to capture images of the user for face recognition; and a speaker, wherein the user speaks through the speaker to recognize the voice of the user;

a portal; and a door;

wherein the interface is configured to control access through the portal via the door;

wherein if the user meets specific access requirements, which include each of: the user pulse is within a predetermined pulse range, the user temperature is within a predetermined temperature range, the user voice is recognized, and the user face is recognized, the door is unlocked via the interface; and wherein the interface verifies the identity of the user via the camera and the speaker, and healthiness of the user via the scanner and the thermometer.

2. A method of verifying the identity and health of a user, comprising:

providing the system of claim 1;

pressing the finger of the user against the scanner;

reading a fingerprint, temperature, pulse and voice of the user;

recognizing the user via images captured by the camera;

determining the health of the user based on the pulse and the temperature read by the scanner;

if the user is determined to be healthy, opening the door; and if the user is not determined to be healthy, establishing a connection to an administrator computer.

* * * * *